Figure 1:
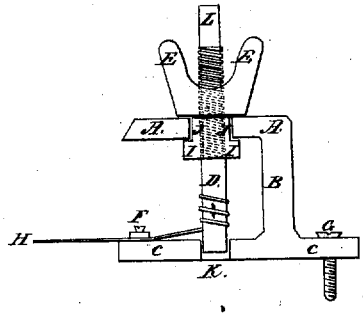

7848X

J. J. Wise,

Tuning Pianos,

Patented Nov. 19, 1833.

Tuning hammer:

Tuning Pin.

The tuning hammer without the dial plate shewing the spring and lever:

A.M. PHOTO-LITHO. CO. N.Y. (OSBORNE'S PROCESS)

John S. Wise Nov 19, 1833

The schedule referred to in these Letters Patent and mak-
ing part of the same containing a description in the words
of the said John S. Wise himself of his improvement
in the mode of tuning pianos and other stringed mu-
sical instruments.

To all to whom it may concern —

Be it known that I John S. Wise of the City of Bal-
timore in the State of Maryland have invented a new &
useful improvement in the mode of tuning pianos (and
other stringed musical instruments which I have called
Wise's mechanical tuning hammer and which is
accurately described in the following words and figures
My improvement consists of a mechanical combina-
tion founded upon the fact or principle that sound up-
on stringed instruments varies with the degree of ten-
sion given to the strings being "high" in musical lan-
guage as the tension is increased and "low" as it is di-
minished. Every string is capable of producing a
certain number of musical notes. and the same degree
of tension will produce the same note. on strings of the
same size and length, or within so close an approxi-
mation as to render any difference imperceptible to the
ear. It is also a fact upon which my improvement
is founded. that the degree of tension to produce any given
note is capable of being measured and ascertained to a suf-
ficient degree of exactness. If therefore a person wish-
ing to tune a stringed instrument should be fur-
nished with the means of giving to a string the tension
necessary to produce a certain note he will be able to
tune the string to the required note and though he
should never have tuned a stringed instrument
before, be utterly ignorant of music, and though he 10,181 he should not have in ordinary phrase "an ear for music". The mechanical combination or the means by which I produce this result consists of two parts — 1st a peculiar arrangement of the fastening of the moveable ends of the strings of the instrument 2. a mechanical tuning hammer, the construction of these two parts is as follows, 1. the fastening of the moveable end of the strings. these may be made in various ways. but all must comply with the condition that the tuning pin shall move perfectly free, and as far as practicable. without any other friction than that which the tension of the string may cause. In ordinary stringed instruments. the tuning pin is made to retain the string at the required tension by the friction of the pin in the tuning block, in a piano or harp. or the screw pin in the neck of a guitar or violin. In my improvement there must be no such friction if practicable. or as little as practicable. so that the least perceptible tension shall be sufficient to move the pin unless retained by other than its own friction in the substance in which it is put. The mode which I have adopted although there may be many others equally effective is to have screwed to the tuning block in a piano. a metallic ledge. which is represented at figure No 1. on the accompanying drawing. where a section of it is given at the letters A.A. about one fourth of an inch thick. and one and a half — inch wide raised about one and a half inch from the tuning block by a metal support B. which in its turn is fixed to a base C.C. the ledge support and base being all of the same piece of metal and secured to the tuning block by the screw at G. The holes for the tuning pins are in the ledge A.A. and occupy the same relative position

Figure 2:
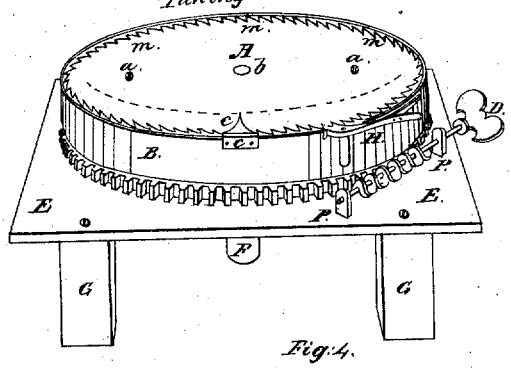

[illegible] ordinary) and corresponding with each hole, in the
ledge is a smaller one K. below in the base. The tuning
pin L.D. is of the size of the hole in the base, say one fourth
of an inch in diameter, and has screwed upon it, a fixed
nut of the shape I.I.I.I. the upper or narrowest part of
which I.I. fits so as to turn with the least possible fric-
tion in the hole in the ledge. The mode in which this nut
is fastened to the tuning pin is made necessary by the ledge
and base being inseparable. Above the ledge A.A. (and
on the tuning pin, is a movable thumb screw G.G. by
turning which the ledge is pressed or loosened between
the thumb screw and the shoulder I.I. of the fixed nut,
the tuning pin secured in any required position —
The string H is fastened to the tuning pin near where
it enters into the base. at K. of the tuning ledge —
In order to press the strings on the base of the tuning
ledge, which is done upon the tuning block, in the
ordinary mode of construction by making the strings
press against small brass pins, I use a small piece
of steel or iron for every two strings F. which I press
against them by a screw passing through it and screw-
ing between the two strings into the base of the tuning
ledge. This may be dispensed with though I think
it preferable to use it. 2. The tuning hammer.
This consists of a steel pipe, see the figure No 2 in the ac-
companying drawing E with a hole at bottom fitting the
head (L Fig. 1.) of the tuning pins and the upper ends
of which pipe passes into a cylindrical box B. and is
made to connect (at [illegible] Q. fig 3. ). by means of a lever
(R. R. fig 3) with the two ends of steel springs M.M.
fig 3.) the other ends of which are fastened to the box (X.
X. fig 3.) so that by turning the box B. the resistance
which the tuning pins oppose to the pipe E fig 2. are —
through

Figure 3:
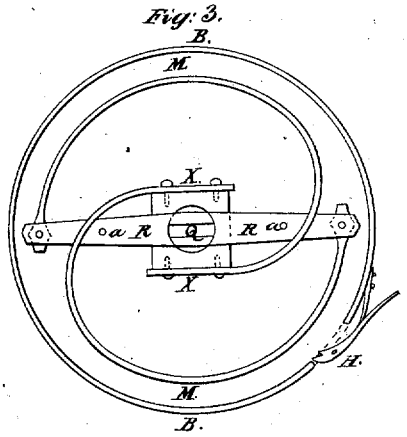

[illegible] to the tuner R.R. fig. 3 causes the springs M.M.
to contract or expand as may be. Fastened to the lever by
means of small screws at (a. a. figs. 2&3.) and forming the
top of the box is a dial plate A fig. 2. marked with such
divisions to indicate, through the agency of the spring, the force
or tension applied at any moment, and the scale of which has
been previously ascertained by experiment. The edge of the dial
and plate (m. m. m. fig. 2.) is notched so that it may --
be retained in any given position by a catch fixed on
the box H. figs. 2&3. forming the well known contrivance of
a ratchet and click. The index C.C. fig. 2. is made
fast to the box. The box with its contents is placed upon a
frame of metal E.E. fig. 2. so made as to raise the box by
small legs G.G. fig. 2. a proper distance from the ledge
A A fig. 1. The pipe F fig. 2. passes through this frame per-
mitting the box to move on the frame around it as an axis.
The mode of applying the mechanical tuning ham-
mer and the manner of its operation is as follows. The
pipe is put upon the tuning pin, when the frame will
be found to rest on its legs on the ledge A.A. fig. 1. and
the tuner turns the box B. fig. 2. to tighten the string to
be tuned, first loosening the thumb screw E.E. fig. 1.
The tuning pin moves freely in the ledge, until the
string begins to pull when the spring is contracted
and the dial plate necessarily travels forward. The
tuner then continues to turn the box until the index
points to the mark on the dial plate, which indicates
the degree of tension necessary to produce the required
note on the particular string. The catch then holds the
dial plate from traversing backwards, while the tuner
turns the thumb screw, and confines the tuning pin
in the position to which he has brought it, thereby main-
taining the proper degree of tension to produce the note
required required. Should the metal holder E fig. 1 be used
it is next screwed down on the strings — — —
In addition to the ratchet and click of the dial plate
and key. I use an endless screw D. fig. 2 for the
purpose of making more minute divisions. This is fas-
tened to the frame at P.P. fig. 2, and works into cogs
projecting from the key. The key it will be recollected
moving round the pipe which is placed through the frame, the
points on the dial plate indicating the tension for
all required notes, are previously ascertained by trials
and appropriate instructions for the application of the
instrument to the different strings accompany it.
In connection with the mode of fastening the
moveable ends of the strings hereinbefore described,
and for the purpose of simplifying the operation of the
mechanical tuning hammer, I use a new mode
of stringing the piano, by which one tuning pin
is made to answer for two strings, by which the num-
ber of tuning pins is reduced to one half and the time
required to tune the piano is shortened. Two adjoin-
ing strings as A.B. fig. 4. are formed of the same piece
of wire, the two ends of which are fastened to the two adja-
cent hitch pins G.H. fig. 4. In the loop which is for-
med in the wire by this arrangement a pulley whose
diameter is equal to the proper distance between the two
strings when stretched is placed C. fig. 4. Which pulley
has a strap and hook D.E. to which is - - - - fasten-
ed the wire that goes round the tuning pin. The
motion of the tuning pin draws back the pulley and
stretches the string on either side of it equally, and
when a sufficient tension is given the piece of iron
or steel K fig. 4. is screwed down and confines the
strings. In making use of this mode of stringing a pi-
ano

Figure 4:
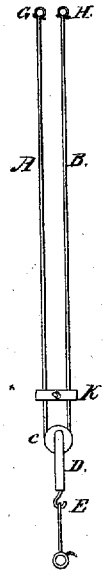

[illegible]

one, the tuning bridge is moved far enough back to make room for the pulleys, and the screws which as at B. fig. 4. confine the strings screw into a separate fix-ture for them. The above described mode of stringing two strings to one tuning pin may be used, or not at pleasure. The correctness of the tune of a piano or other stringed instrument may always be preserved by applying the key to the tuning pin and bringing the index to the proper position on the dial plate.

The construction here described is particularly fitted for the piano and Harp. a small modifyca-tion would be necessary for the guitar and violin.

What I claim as new, and for which I ask an exclusive privilege is 1. The arrangement or mode by which the moveable ends of the strings are fastened or loosened, as well when there is a tuning pin to each string as where the piano is so strung as to require only one tuning pin for two strings. 2. The mode of tuning a piano or stringed musical instrument without the assistance of the ear by measuring and ascertain-ing the degree of tension necessary to produce any re-quired note on a given string or strings. and furnish-ing the tuner with the means of applying that degree of tension precisely and mechanically, and 3. the combination by which the end desired is effected.

Witnesses
Jno H. B. Latrobe
Benjn C. Presbman

John S. Wise

Dr in portfolio)

(2090 words)